United States Patent [19]
Franks, Jr.

[11] Patent Number: 4,884,976
[45] Date of Patent: Dec. 5, 1989

[54] CLAMP FOR ELECTRICALLY CONDUCTIVE STRIPS

[76] Inventor: George J. Franks, Jr., 664 Thompson Cir., Inverness, Ill. 60067

[21] Appl. No.: 234,975

[22] Filed: Aug. 22, 1988

Related U.S. Application Data

[63] Continuation-in-part of Ser. No. 116,899, Nov. 3, 1987, Pat. No. 4,828,504.

[51] Int. Cl.$^4$ ............................................. H01R 4/66
[52] U.S. Cl. ..................................... 439/92; 439/433; 439/803
[58] Field of Search ................ 269/249; 439/411, 413, 439/92, 803, 810, 813, 814, 431–435

[56] References Cited
U.S. PATENT DOCUMENTS
4,476,759 10/1984 Aderneck ....................... 269/249 X

FOREIGN PATENT DOCUMENTS
2195837 4/1988 United Kingdom ................ 439/431

Primary Examiner—Eugene F. Desmond
Attorney, Agent, or Firm—Jenner & Block

[57] ABSTRACT

A clamping device having a U-shape provides a mechanical and electrical connection between two flat ribbons or strips of electrically conductive material. The strips of material may, for example, be thin copper bars for grounding purposes in an underground telephone vault. One inner surface of the U-shaped clamp includes at least one projecting point which is positioned directly opposed to at least one threaded bolt movably disposed and extending from the opposed inner surface. The free end of the bolt is formed with a complementary recess and an abrading surface surrounding the recess. In a preferred embodiment, a pair of such threaded bolts are offset from each other and are mounted in opposite legs of the U-shaped clamp. The bolts may be formed with a slotted head for securing another conductor or bonding ribbon therein.

13 Claims, 1 Drawing Sheet

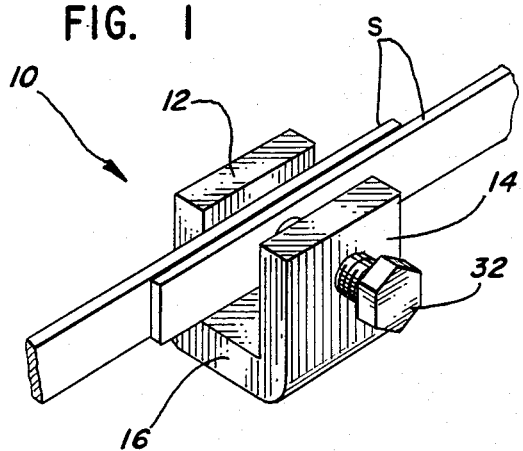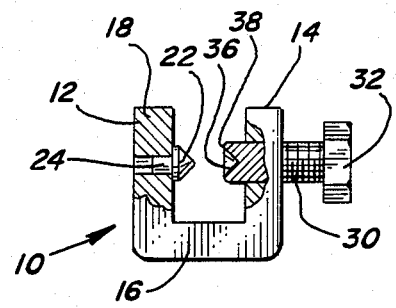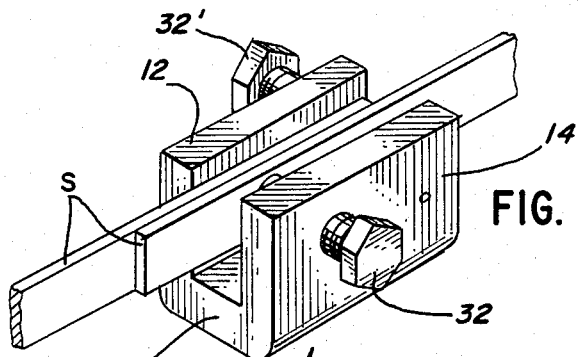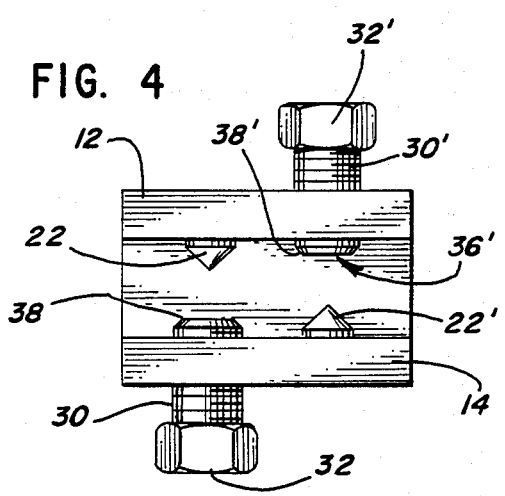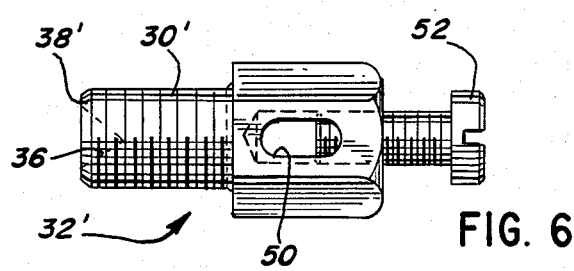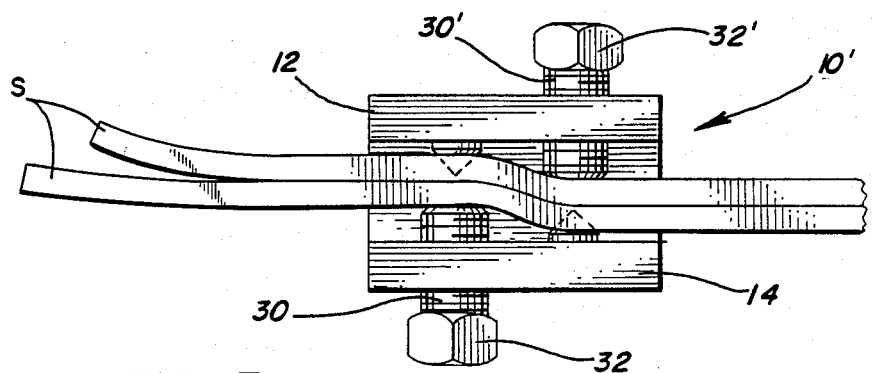

CLAMP FOR ELECTRICALLY CONDUCTIVE STRIPS

This is a continuation-in-part of application Ser. No. 116,899, filed Nov. 3, 1987, now U.S. Pat. No. 4,828,504, the disclosure of which is hereby incorporated by reference.

FIELD OF THE INVENTION

This invention relates in general to clamping devices for providing a mechanical and electrical connection between two flat pieces or strips of electrically conductive material.

BACKGROUND OF THE INVENTION

Flat strips of electrically conductive material, such as relatively soft copper, are used in numerous applications in which it is desired to provide an electrical bond between conductors, such as for grounding purposes. For example, in an underground vault for telephone equipment, it is common to provide thin strips of bonding ribbon which connect underground telephone cables to a grounding system located at the side of the vault. It is often necessary to join two bonding ribbons together, both mechanically and electrically. While clamps have been used to form the mechanical connection, it has been generally necessary to weld or solder together the pairs of bonding ribbons in order to form a sufficient electrical connection.

In an underground vault, the soldering of bonding ribbons is dangerous and undesired in that the telephone cables are nitrogen filled and this gas along with other gases which accumulate in an underground vault can be explosive. In addition, welding or soldering requires specialized equipment and skilled labor in order to form the necessary electrical connection between the bonding ribbons.

When bonding conductors are to be subjected to adverse conditions, the flat conductors may be painted or treated with a protective coating or coated with another layer of metal to provide for long-term life. For example, copper grounding straps may be provided with a pre-tinned top layer. To form an adequate electrical connection, it is necessary to penetrate any layers of dirt, paint and other non-conducting surfaces, as well as corrosion, to provide the necessary electrical connection to the base metal. Any clamp must also be able to maintain a suitable mechanical and electrical connection which will withstand the rigors of the environment in which it is to be used.

Known clamping devices for relatively flat materials have not been suitable for clamping together, both mechanically and electrically, a pair of bonding ribbons or other flat conductive materials without requiring soldering or the like which is undesirable in a number of applications. It is further desirable that any clamping device be of simple construction and relatively low cost. These desirable attributes have not been found in a single device which can also eliminate the need for soldering in underground vaults and other environments in which known methods of forming an electrical bonding connection are unsuitable.

SUMMARY OF THE INVENTION

In accordance with the present invention, a novel clamping apparatus provides a mechanical and electrical connection between a pair of flat pieces or strips of electrically conducting material. The clamps of the present invention are capable of providing this connection without the need for any welding or soldering. The dangers associated with welding or soldering in certain applications are therefore avoided. Further, specialized equipment and labor is no longer required.

The clamps of the present invention are substantially U-shaped and have first and second side portions extending generally upward from a common base. The first and second side portions are preferably substantially parallel and opposing each other.

In one embodiment, the first side portion has a point extending outwardly towards the second side portion. The second side portion carries securing means for the clamp, which preferably comprises a threaded stud or bolt. The end of the bolt has a recess which may be cup-shaped or cone-shaped. The center line of the bolt is preferably coaxial with the center line of the recessed portion. As the threaded bolt is tightened, a pair of bonding ribbons located between the bolt and the point are deformed by the point into the cup-shaped recess, and simultaneously are abraded in order to penetrate the bonding ribbon and form an electrical connection to the ribbon.

In a second and preferred embodiment, a pair of the threaded studs or bolts and a pair of points are provided in the U-shaped clamp, with one threaded bolt being located opposite and offset from the other. As the pair of threaded bolts are tightened, they engage opposite ones of the bonding ribbons and each abrade the bonding ribbon to form an electrical connection to its adjacent bonding ribbon. The U-shaped connector and the bolts are electrically conductive and thereby form a bridge between the bonding conductors sufficient to eliminate the need for soldering between the bonding conductors. The opposed points also deform the bonding ribbons into the opposite cup-shaped recesses of the threaded bolts in order to form a superior mechanical connection.

One object of the present invention is to provide an improved clamping apparatus for providing a simultaneous mechanical and electrical connection between a pair of strips of electrically conductive material in order to eliminate or reduce the need for soldering or other methods of forming the electrical connection therebetween.

Another object of the present invention is to provide a clamping apparatus for electrical bonding ribbon in which the ribbon is deformed by the clamping device in order to provide a more secure mechanical and electrical connection.

Other objects and advantages of the invention will become apparent upon the following detailed descriptions with references to the drawings. Throughout the drawings, like reference numerals refer to like parts.

BRIEF DESCRIPTION OF THE DRAWINGS

FIG. 1 is a perspective view of one embodiment of a clamp apparatus used in joining two flat pieces or strips of material;

FIG. 2 is a sectional side view of the embodiment shown in FIG. 1 without the strips between located therein;

FIG. 3 is a perspective view of another and preferred embodiment of the clamp apparatus used in joining two flat pieces or strips of material;

FIG. 4 is a top view of the embodiment shown in FIG. 3 but before the two flat pieces of material are located therein;

FIG. 5 is a top view of the embodiment of FIG. 4 in which the two flat pieces or strips of material have been located and clamped therein; and FIG. 6 is a side view of an alternative embodiment for the threaded stud.

DETAILED DESCRIPTION OF THE PREFERRED EMBODIMENTS

Referring now to FIG. 1, there is shown an embodiment of the novel clamp apparatus 10 for mechanically and electrically connecting together two strips or flats S of electrically conductive material. Strips S may, for example, be two thin, elongated copper bars, either coated with another material, such as pre-tinned, or not, which are typically used as bonding ribbons for grounding purposes such as in an underground telephone vault.

As illustrated in FIGS. 1–2, clamp 10 is substantially U-shaped, and includes two upwardly extending first and second side legs or arms 12 and 14 joined to a common base 16. First and second portions 12 and 14 are preferably substantially parallel to and opposing each other. First and second portions 12 and 14 have first and second inner surfaces, 18 and 19, respectively.

As illustrated in FIG. 2, a point 22 is fixedly formed on first inner surface 18 and extends outwardly towards second inner surface 19. Point 22 is preferably formed of an electrically conducting material. Point 22 is generally cone-shaped and is of harder material than the material of the strips S. Point 22 may comprise an insert consisting of an enlarged head and a reduced diameter shank or cylindrical body 24 which snugly fits into a reduced diameter bore formed entirely or partially through the first portion 12. In this manner, the insert point 22 can readily be formed of a hardened material and it is unnecessary to form the remainder of the clamp 10 of the same material in order to reduce the expenses of forming the clamp. Alternatively, the point 22 may be integral with the first portion 12, particularly when the straps S to be clamped are very soft copper bonding ribbons, in which event the entire clamp as well as the point may be formed of bronze.

The opposed, second portion 14 of the clamp 10 has a threaded opening formed therethrough which is substantially coaxial with the axis of the center line of point 22. The opening may be fine threaded and has received therein a threaded stud or bolt 30. Bolt 30 is preferably formed of an electrically conducting material, such as bronze, which is harder than the material of the strips S. Bolt 30 has a hexagonally-shaped head 32.

The terminal or free end of the stud 30 is formed with a recess 36 which complements the shape of the point 22 positioned opposed thereto. Recess 36 is generally cup-shaped or cone-shaped. Surrounding the recess 36 is an annular abrading edge 38 which is of sufficient hardness to penetrate the material of the straps S. In the case of bonding ribbon of soft copper, the normal roughness in machining the bolt is generally sufficient to grind through any material coating the strap S as well as corrosion which may be on the strap. However, the abrading edge 38 may be formed with a knife edge or a serrated annular surface as disclosed in my earlier parent application U.S. Ser. No. 116,899, filed Nov. 3, 1987, the disclosure of which is hereby incorporated by reference herein. The surface of the edge 34 is selected to be sufficiently hard to penetrate by abrading or grinding action any corrosion or other surface which coats the bonding ribbon S so as to penetrate mechanically and electrically into the flat material S.

In operation, two straps S of metal are placed in a position substantially between first and second portions 12 and 14 as illustrated in FIG. 1. Threaded bolt 30 is turned by means of the hexagonally-shaped head 32 causing a portion of strips S adjacent recess 36 to be trapped between point 22 and the free end of bolt 30. As bolt 30 continues to be tightened, the centering of bolt 30 directly over the fixed point 22 causes maximum force to be applied during tightening.

As bolt 30 is turned against the straps S to be clamped, the annular abrading edge 38 cleans the surface of strap S adjacent recess 36 by mechanically scraping any dirt, paint coating or corrosion from the outer surface, and penetrates the outer surface of strap S. Point 22 also penetrates the strap S adjacent to it to provide both a better electrical connection and a more intimate mechanical securing of clamp 10 to the adjacent strap S.

Preferably, straps S are less hard than the material from which point 22 and bolt 30 are formed, so that upon tightening of bolt 30, a portion of strap S adjacent recess 36 is forced into the recess 36 by point 22 and bolt 30, enhancing the mechanical connection of clamp 10 to straps S. Straps S are thereby mechanically deformed adjacent point 22 and the recess 36 in bolt 30. Recess 36 formed in the face of bolt 30 also functions to retain some of the loose material mechanically worked or scraped from the face of straps S to minimize contamination which might occur from the mechanical abrasion of the panel.

Referring now to a second and preferred embodiment of the invention as illustrated in FIGS. 3–5, the mechanical and electrical connection is provided to both sides of the pair of strips S by the apparatus 10, illustrated in the drawings. Like reference numerals in FIGS. 3–5 indicate corresponding parts to those of the previously described embodiment in FIGS. 1–2. This second embodiment is useful in situations where sufficient mechanical and electrical contact between flat pieces or strips of electrically conductive material may not be achieved by only one point 22 and one bolt 30. For example, the first embodiment of FIGS. 1–2 is sufficient when the pair of bonding ribbons S are new and have no outer coating which is non-conductive. In an existing underground vault, however, a bonding ribbon may be replaced with a new ribbon, but the new ribbon must bond or bridge to an existing electrical ribbon which may be corroded. In the situation in which both electrical conductors are not new or may not be new, the embodiment of FIGS. 3–5 is preferred in that an electrical connection is formed between both pairs of bonding ribbons S through the clamp 10′ itself, and there is an improved mechanical connection.

As seen in FIGS. 3–5, the embodiment of clamp apparatus 10, essentially comprises two clamps in side-by-side relationship, but integrally formed and facing oppositely so that the abrading surfaces of their respective bolts will abrade and engage opposite ones of the straps S. This forms an electrical connection to each of the straps and, through the bolts and clamp itself, an electrical connection between the straps sufficient to eliminate soldering and the like in many applications. More particularly, the same upright arms or legs 12 and 14 are formed but are longer than that illustrated in the previous embodiment. In addition to the point 22 and its oppositely facing threaded bolt 30, a second point 22' is formed (and may be a hardened insert with an enlarged head and a reduced diameter shank in a bore) but is located in the arm 14 rather than the arm 12. A second threaded bolt 30' is located in a threaded bore in the arm 12 rather than the arm 14, and is located coaxially with the hardened point 22'. The axis of the second threaded bore in arm 12 is offset from the axis of the first threaded bore and is spaced therefrom along the length of the ribbons S. The second threaded bolt or stud 30' has an annular abrading edge 38 which surrounds a recess 36' which is preferably cup-shaped or cone-shaped and is located in the free end thereof similar to that shown for bolt 30 in FIG. 2.

When straps S are placed within the composite clamp, and the bolts 30 and 30' are tightened, as seen in FIGS. 3 and 5, a mechanical and electrical connection is provided but now exists to each of the straps S. Points 22 and 22' will mechanically work or penetrate into the adjacent strap material from its respective side of the clamp. The strap material will deform into the recess of the respective studs 30 and 30' located adjacent thereto. The mechanical connection is enhanced from that of the previous embodiment because the pair of strips form an S-shaped or snake-like configuration through the clamping device because the bolts are on opposed sides and each engage and clamp the straps towards opposite sides. This forms a very superior mechanical connection and, in addition, a superior electrical connection formed by the connection from a strap S through the adjacent abrading edge 38 or 38' and the bolt itself to the electrically conductive clamp device 12, 14, 16 and thence to the opposite bolt and abrading edge into the opposite strap S. In this embodiment, the bonding ribbon in a vault may be replaced with a new ribbon and adequately coupled to an existing bonding ribbon in an underground vault which is already corroded to some extent.

While the stud 30 has been illustrated with a solid, hexagonally-shaped head 32, any one or more of the studs in FIGS. 1-5 can be replaced with stud 30' whose head 32' is in the form of an additional connector for a ground wire or other conductor, as seen in FIG. 6. The head 32' has a threaded internal bore coaxial with the longitudinal axis of the stud. This bore intersects a transverse slot or bore 50 which receives a wire(s) or ribbon(s) therein. A screw 52 is threaded into the internal coaxial bore to engage the connector in bore 50 and thus secure mechanically and electrically the conductor to the stud 32' and hence to the clamp device.

The bore 50 is preferably a slot of elongated shape with a length sufficient to receive one or two additional bonding ribbons therein, but can be screwed down onto a single grounding wire, if desired.

While the invention is described in connection with preferred embodiments, it will be understood that it is not intended to limit the invention to these embodiments. On the contrary, it is intended to cover all alternatives, modifications and equivalents as may be included in the spirit and scope of this invention as defined by the appended claims.

What is claimed is:

1. A clamping device for mechanically and electrically connecting together two strips of electrically conductive materials, comprising:
   first and second legs extended outwardly from a common base for positioning therebetween the two strips;
   a point rigidly mounted to and extending outwardly from the first leg toward the second leg and having a hardened tip with respect to the material of the strips; and
   threaded stud means rotatably mounted within a bore in the second leg and positioned coaxially with the point, the threaded stud means extending outwardly towards the first leg and having a free end with an abrading surface surrounding a recess and rotatable to affect axial movement to clamp the two strips between the hardened tip and the abrading surface with a portion of the material of the strip being forced into the recess on the threaded stud means to thereby form a mechanical and electrical connection between the two strips wherein the threaded stud means has a head with a bore formed therein for receiving a conductor, and securing means for clamping the conductor to the head.

2. A clamping device for mechanically and electrically connecting together two strips of electrically conductive material, comprising:
   a first leg and a second leg extending outwardly from a common base;
   a first threaded bore located in the first leg and a second threaded bore located in the second leg and having an axis offset from the axis of the first bore; and
   a pair of threaded stud means rotatably mounted in the threaded bores and each having a free end with an abrading surface and each rotatable to affect axial movement of its free end toward the opposite leg, the two strips being positionable between the legs with one of the strips being engageable by one of the threaded stud means and the other of the strips being engageable by the other of the threaded stud means.

3. The clamping device of claim 2 wherein at least one of the threaded stud means includes a head having a pair of intersecting bores therein, one of the bores holding a conductor therein, and the other of the bores being threaded and containing a screw for clamping the conductor in the intersecting bore.

4. The clamping device of claim 3 wherein the threaded stud means in the second threaded bore has an annular abrading surface surrounding a recess with the recess being of complementary shape to the first point.

5. The clamping device of claim 2 including a point fixedly located on the first leg and being coaxial with the second threaded bore to thereby clamp the strips between the point and the threaded stud means rotatably mounted in the second leg.

6. The clamping device of claim 5 including another point located on the second leg and being coaxial with the first threaded bore to thereby clamp the strips between said another point and the threaded stud means rotatably mounted in the first leg.

7. The clamping device of claim 6 wherein the points have hardened tips with respect to the material of the two strips to penetrate the material of the two strips.

8. A clamping device for mechanically and electrically connecting together two strips of electrically conductive material, comprising:
   U-shaped clamping means having a first leg and a second leg extending outwardly from a common base;

a first threaded bore located in the first leg and a second threaded bore located in the second leg and having an axis offset from the axis of the first bore;

a first point on the second leg and located coaxially opposite the first threaded bore;

a second point on the first leg and located coaxially opposite the second threaded bore;

a first threaded stud means rotatably mounted in the first threaded bore and having a free end with an abrading surface surrounding a recess, the free end being axially movable by rotation of the first stud towards the first point to clamp therebetween the two strips of electrically conductive material; and a second threaded stud means rotatably mounted in the second threaded bore and having a free end with an abrading surface surrounding a recess, the free end being axially movable by rotation of the second stud towards the second point to clamp therebetween the two strips of electrically conductive material;

whereby the first threaded stud engages one of the two strips and the second threaded stud engages the other of the two strips at a position offset from the first threaded stud.

9. The clamping device of claim 8 wherein each of the recesses is of generally complementary shape to the points located coaxial therewith.

10. The clamping device of claim 8 wherein each of the points comprises an enlarged head of generally cone shape which is coaxial with the threaded bore in the opposite leg.

11. The clamping device of claim 8 wherein each of the points is formed by a hardened insert having an enlarged head and a reduced diameter neck, and a reduced diameter bore located in each of the legs for receiving the reduced diameter neck to mount the hardened insert therein.

12. The clamping device of claim 8 wherein at least one of the threaded stud means includes a head having a pair of intersecting bores therein, one of the bores holding a conductor therein, and the other of the bores being threaded and containing a screw for clamping the conductor in the intersecting bore.

13. The clamping device of claim 12 wherein the one bore holding the conductor is a slot of elongated shape for holding another strip of electrically conductive material therein.

* * * * *